United States Patent
Basu

(10) Patent No.: US 11,409,450 B2
(45) Date of Patent: Aug. 9, 2022

(54) CHANNEL ARCHITECTURE FOR MEMORY DEVICES

(71) Applicant: Micron Technology, Inc., Boise, ID (US)

(72) Inventor: Reshmi Basu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 310 days.

(21) Appl. No.: 16/442,902

(22) Filed: Jun. 17, 2019

(65) Prior Publication Data
US 2020/0393984 A1 Dec. 17, 2020

(51) Int. Cl.
*G06F 3/06* (2006.01)
*G06N 20/00* (2019.01)

(52) U.S. Cl.
CPC .......... *G06F 3/0632* (2013.01); *G06F 3/0604* (2013.01); *G06F 3/0659* (2013.01); *G06F 3/0673* (2013.01); *G06N 20/00* (2019.01)

(58) Field of Classification Search
CPC ........ G06F 30/27; G06F 3/061; G06F 3/0659; G06F 3/0679; G06F 13/20; G06F 1/26; G06F 1/3243; G06F 2009/45583; G06F 13/1642; G06F 13/1652; G06F 13/1663; G06F 13/1668; G06F 13/1684

See application file for complete search history.

(56) References Cited

U.S. PATENT DOCUMENTS

| 7,426,597 | B1 * | 9/2008 | Tsu ...................... G06F 13/4018 |
| | | | 710/307 |
| 8,392,312 | B2 | 3/2013 | Batsakis et al. |
| 10,097,478 | B2 | 10/2018 | To et al. |
| 2012/0195324 | A1 * | 8/2012 | Raghuraman ........... H04L 47/00 |
| | | | 370/431 |
| 2014/0149775 | A1 * | 5/2014 | Ware ..................... G06F 1/3293 |
| | | | 713/323 |
| 2016/0342549 | A1 | 11/2016 | Hathorn et al. |

FOREIGN PATENT DOCUMENTS

EP    2758877 B1    6/2019

* cited by examiner

*Primary Examiner* — Reginald G Bragdon
*Assistant Examiner* — Thanh D Vo
(74) *Attorney, Agent, or Firm* — Brooks, Cameron & Huebsch, PLLC

(57) ABSTRACT

Systems, apparatuses, and methods related to channel architecture for memory devices are described. Various applications can access data from a memory device via a plurality of channels. The channels can be selectively enabled or disabled based on the behavior of the applications. For instance, an apparatus in the form of a memory system can include an interface coupled to a controller and a plurality of channels. The controller can be configured to determine an aggregate amount of bandwidth used by a plurality of applications accessing data from a memory device coupled to the controller via the plurality of channels and disable one or more channels of the plurality of channels based, at least in part, on the aggregate amount of bandwidth used by the plurality of applications.

27 Claims, 6 Drawing Sheets

CHANNEL ARCHITECTURE FOR MEMORY DEVICES

TECHNICAL FIELD

The present disclosure relates generally to semiconductor memory and methods, and more particularly, to apparatuses, systems, and methods for channel architecture for memory devices.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host and/or applications running on the host while the computer or electronic system is operating. For example, data, commands, and/or instructions can be transferred between the host and the memory device(s) during operation of an application running on a host, computing, or other electronic system.

DETAILED DESCRIPTION

Figure 1:
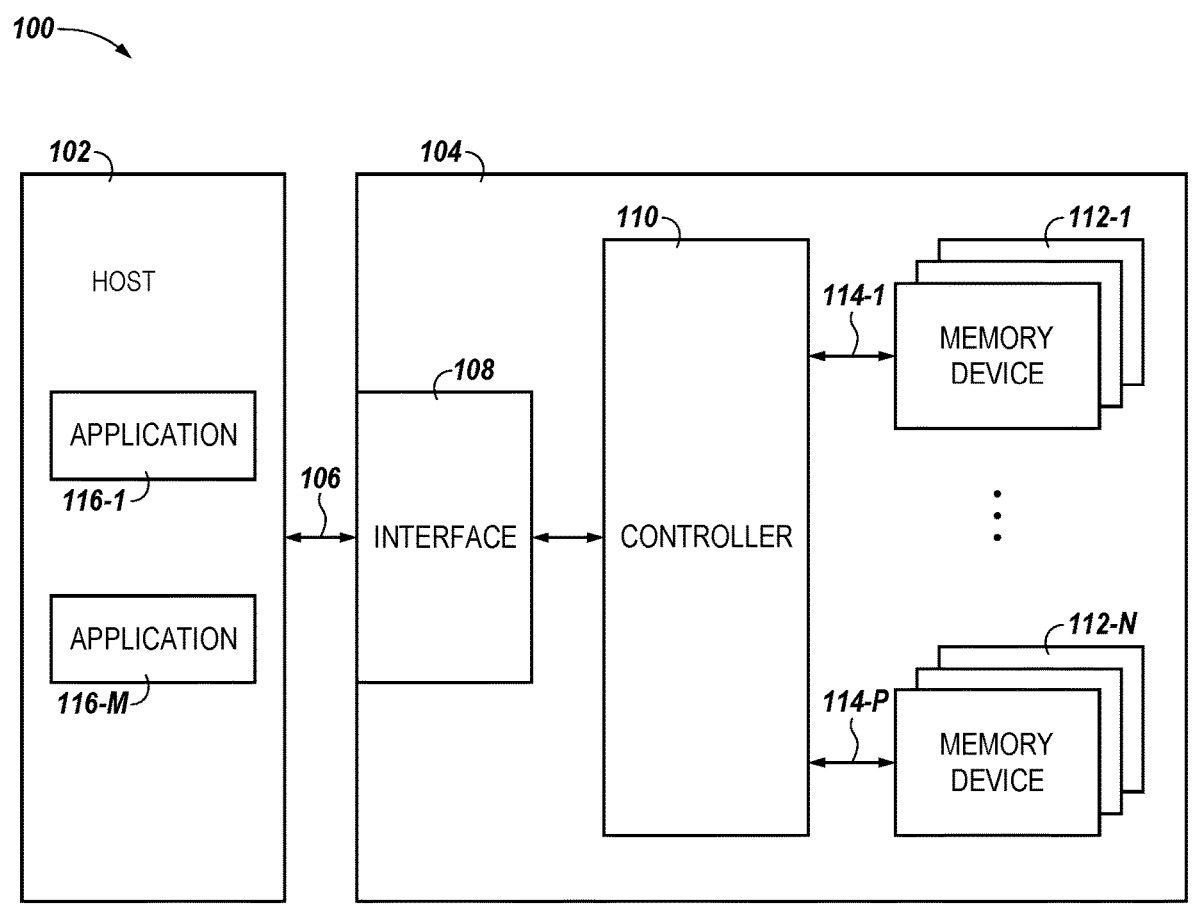
FIG. 1 is a functional block diagram in the form of a computing system including an apparatus including a memory system in accordance with a number of embodiments of the present disclosure.

Systems, apparatuses, and methods related to channel architecture for memory devices are described. Various applications can access data from a memory device via a plurality of channels. The channels can be selectively enabled or disabled based on the behavior of the applications. For instance, an apparatus in the form of a memory system can include an interface coupled to a controller and a plurality of channels. The controller can be configured to determine an aggregate amount of bandwidth used by a plurality of applications accessing data from a memory device coupled to the controller via the plurality of channels and disable one or more channels of the plurality of channels based, at least in part, on the aggregate amount of bandwidth used by the plurality of applications.

Memory devices, such as flash memory devices, may be used to store data in a computing system and can transfer such data between a host associated with the computing system, and/or between applications running on the host associated with the computing system. The data stored in a memory device can be important or even critical to operation of the computing system and/or the application(s) running on the host. Flash memory devices are utilized as non-volatile memory for a wide range of electronic applications. Flash memory devices typically use a one-transistor memory cell that allows for high memory densities, high reliability, and low power consumption.

Memory devices that store data within memory cells may be included in a memory system. The data can be accessed by applications running on a host via channels coupled to a controller (e.g., a media controller, a memory device controller, etc.). The channels can comprise back end channels of the controller. The memory device controller can be a media controller such as a non-volatile memory express (NVMe) controller that is tightly coupled to the memory device (e.g., the memory cells, blocks, sectors, etc. of the memory device).

A channel can communicatively couple the application to a memory device and facilitate transmission of data to and from the memory device to the application for execution. Running applications on a host can utilize power from the memory system when the channels are enabled to transmit data from the memory device to the applications. The amount of power used may depend on a quantity of channels that are enabled to facilitate the execution of applications. For example, when the applications are accessing data from a memory device coupled to the controller an amount of power used may depend on characteristics of the applications, which can correspond to the quantity of channels that are enabled.

The amount of power consumed in execution of the applications can be determined by the bandwidth demand of the applications and be referred to herein as a bandwidth demand. In some embodiments, the applications may be running on a front end of the memory system and the amount of bandwidth needed to execute the operations of the applications can be referred to as a front end bandwidth demand. However, in some approaches, additional channels may be enabled than are needed to execute the applications and satisfy the bandwidth demand. Applications can have the same and/or differing bandwidth requirements to execute operations and can correspond to an individual channel to receive data from a memory device or multiple applications may share an individual channel to receive data. In some approaches, each enabled channel may consume a threshold amount of power regardless of the application or applications to which it is providing data. Power consumption of a memory system can increase a temperature of the memory system, waste resources, and/or decrease efficiency. As such, disabling excessive channels can conserve resources, and increase efficiency.

In some approaches, memory systems may be designed to run a limited number of applications to maintain a homeostatic temperature and a level of efficiency. As a number of applications requesting data from the memory devices of the memory system increase, the memory system can experience application execution failures, or an increase in temperature that can cause failures in the execution of the applications. In some approaches, such temperature increases can be mitigated through the use of cooling systems that can reduce application execution failures and other adverse thermal effects. However, such cooling systems can require space (e.g., a footprint) in the memory system and/or additional processing resources to maintain an appropriate temperature for the efficient operation for the applications extracting data from the memory devices.

Because the amount of space (and hence, the amount of space available to provide processing resources and/or cooling systems) available on a memory device can be limited due to various constraints such as form factors, cell densities, memory array architectures, power limitations, and/or desired storage capacities, it can be difficult to provide adequate processing resources on the memory device to operate additional channels and/or provide cooling to the memory system while supplying data stored by a memory device. As a result, due to form factor and/or power consumption limitations, performance efficiency of the memory device can, in some approaches, be limited.

As the storage capability of memory devices increases, these effects can become more pronounced as more and more data is able to be stored by the memory device and therefore accessible to applications running on the host. This can lead to an increase in the number of channels required to provide the data stored to applications. These effects can be further exacerbated by the limitations of some approaches to power management on memory systems described above, especially as the amount of data stored in memory devices increases and the speed at which data retrieval is expected increases.

In contrast, embodiments herein are directed to a channel architecture to provide data to applications using a modularized design based on the amount of bandwidth required by applications accessing data and/or an amount of bandwidth consumed in execution of the applications. For example, in some embodiments, the memory system can reduce its power usage by disabling channels that are not necessary to provide data to the applications. Operations of applications can be consolidated to utilize less channels thereby decreasing an amount of power used by the memory system.

As described herein, the controller can determine a bandwidth demand of applications running and/or communicable with/on the host. The controller may selectively disable one or more channels that are not necessary to provide data to the applications and fulfil the bandwidth demand. In some examples, the disabled channels may not have been utilized to provide data to the applications. In other examples, the operations formerly performed by the selectively disabled channels may be shifted to different (e.g., enabled) channels. The action of shifting operations from a channel selected to be disabled to an enabled channel may be referred to herein as "consolidation." Disabling channels reduces the amount of power of the memory system which can save resources and decrease a temperature of the memory system.

In addition, in some embodiments, the controller can be prompted to aggregate an amount of bandwidth consumed in execution of applications by an increase in temperature of the memory device, or the addition/reduction of applications accessing data. The aggregation of the amount of bandwidth required can include the controller checking a quantity, an activity level, and/or a priority level of the applications connected to the host. The controller can enable and/or disable the channels providing data to the applications independently such that any encryption, error-correction, or media management logic is conserved while the channels are enabled, disabled, and/or consolidated.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," "P," "Q," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling," mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 106 may reference element "06" in FIG. 1, and a similar element may be referenced as 206 in FIG. 2. A group or plurality of similar elements or components may generally be referred to herein with a single element number. For example, a plurality of reference elements 112-1, . . . , 112-N (e.g., 112-1 to 112-N) may be referred to generally as 112. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 104 can be a solid-state drive (SSD), for instance, and can include an interface 108, a controller 110, e.g., a processor and/or other control circuitry, and a number of memory devices 112-1 to 112-N, e.g., solid state memory devices such as NAND flash devices, which provide a storage volume for the memory system 104. In a number of embodiments, the controller 110, a memory device 112-1 to 112-N, and/or the interface 108 can be physically located on a single die or within a single package, e.g., a managed NAND application. Also, in a number of embodiments, a memory, e.g., memory devices 112-1 to 112-N, can include a single memory device.

As illustrated in FIG. 1, the controller 110 can be coupled to the interface 108 and to the memory devices 112-1 to 112-N via one or more channels 114-1 to 114-P and can be used to transfer data between the memory system 104 and a host 102. A channel (e.g., 114-1 to 114-P) can be a path for signaling or communication between the memory devices (e.g., 112-1 to 112-N) and the controller 110 or the controller 110 and the interface 108. Channels 114 may be physical connections made with a conductor (e.g., metal traces, semiconductor material, etc.). Channels 114 may be enabled or disabled by operating switches (e.g., one or more transistors) coupled to the channel 114 and the controller 110 or the memory device 112 (or interface 108), or the like. In some examples, disabling a channel 114 means opening a switch or switches to physically or electrically disconnect (or decouple) a channel 114 thereby removing or opening a signaling path between components or devices.

The interface 108 can be in the form of a standardized interface. For example, when the memory system 104 is used for data storage in a computing system 100, the interface 108 can be a serial advanced technology attachment (SATA), peripheral component interconnect express (PCIe), or a universal serial bus (USB), a double data rate (DDR) interface, among other connectors and interfaces. In general, however, interface 108 can provide an interface for passing control, address, data, and other signals between the memory system 104 and a host 102 having compatible receptors for the interface 108.

The host 102 can be a host system such as a personal laptop computer, a desktop computer, a digital camera, a mobile telephone, an internet-of-things (IoT) enabled device, or a memory card reader, graphics processing unit (e.g., a video card), among various other types of hosts. The host 102 can include a system motherboard and/or backplane and can include a number of memory access devices, e.g., a number of processing resources (e.g., one or more processors, microprocessors, or some other type of controlling circuitry). One of ordinary skill in the art will appreciate that "a processor" can intend one or more processors, such as a parallel processing system, a number of coprocessors, etc. The host 102 can be coupled to an interface 108 of the memory system 104 by a communication channel 106.

In some embodiments, the host 102 can be responsible for executing an operating system for a computing system 100 that includes the memory system 104. Accordingly, in some embodiments, the host 102 can be responsible for controlling operation of the memory system 104. For example, the host 102 can execute instructions (e.g., in the form of an operating system) that manage the hardware of the computing system 100 such as scheduling tasks, executing one or more applications 116-1 to 116-M, controlling peripherals, etc.

The computing system 100 can include separate integrated circuits on the host 102, the memory system 104, the applications 116-1 to 116-M, the interface 108, the controller 110, and/or the memory devices 112-1 to 112-N can be on the same integrated circuit. The computing system 100 can be, for instance, a server system and/or a high-performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

In some approaches, the memory system 104 (e.g., the controller 110), can use the channels 114-1 to 114-P (collectively referred herein as the channels 114) to access data (e.g., a memory cell and/or a group of cells, e.g., a data word, or sector) stored in the memory devices 112-1 to 112-N (collectively referred herein as the memory devices 112), for the execution of the applications 116-1, 116-M (collectively referred herein as the applications 116). The applications 116 can be executed on the host 102 using data stored in the memory devices 112. The term "executed on" may be used interchangeably with other terms such as "resident on", "deployed on" or "located on," herein. The channels 114 are enabled by the controller 110 to provide the data stored in the memory devices 112 to the applications 116. When the channels 116 are enabled, they utilize power of the memory system 104. A disabled channel draws less power from the memory system 104 than a channel that is enabled.

In some embodiments, the controller 110 can determine a bandwidth demand (e.g., a front end bandwidth demand) by determining an aggregate amount of bandwidth used by the applications 116 running on the host 102 accessing data from the memory devices 112. The controller 110 may detect the applications 116 running on the host 102 to determine the bandwidth requirements and/or a priority of the applications 116.

Some applications 116 may be of a higher priority than other applications 116. For example, a high priority application may include applications that provide important information and/or operations to a user of the application and/or the host 102, and/or system-critical applications that must be executed in order for a computing system to operate. An application of a lower priority can include an application 116 that provides entertainment, or less important information to a user for the application and/or the host 102. To reduce power consumption and/or to reduce a temperature of the memory system 104, the controller 110 may consolidate data requested for applications 116 via the channels 114 to reduce power of the memory system 104. For example, the controller 110 may selectively disable one or more channels 114 based at least in part on the aggregate amount of bandwidth used by the applications 116 and/or a level of priority associated with the applications 116.

The controller 110 can selectively disable some channels 114 while refraining from disabling other channels 114. For example, a channel 114-1 may be providing data from the memory device 112-1 to application 116-1. The channel 114-P may be providing data from the memory device 112-N to the application 116-M. The controller 110 can determine the aggregate bandwidth used to execute the applications 116-1 and 116-M and, based on the determination of the aggregate bandwidth, selectively disable the channel 114-P and consolidate the operations required to execute the application 116-M to the channel 114-1. Because the controller 110 can access the memory devices 112-1 to 112-N, the application 116-M can still access data from the memory device 112-N via the channel 114-1. The disabled channel 114-P may still be drawing power from the memory system 104, but the amount of power used by a disabled channel 114-P is less than the amount of power used by the enabled channel 114-1. Embodiments are not so limited, however, and in some embodiments, the disabled channel 114-P may draw a vanishing (e.g., zero or near-zero) amount of power from the memory system 104. In this way, the applications 116-1 and 116-M remain operational while the memory system 104 reduces power. In other words, the applications 116-1 and 116-M can access data via the channel 114-1 that remains enabled subsequent to selectively disabling the channel 114-P.

Further, the controller 110 can be configured to disable the channel 114-P in an independent manner. The controller 110 can be configured to move operations between channels such that any media management logic can be preserved. For example, the application 116-M can include media management logic such as data error-correction (e.g., ECC) or data encryption which can be preserved as the operations of the application 116-M are moved (e.g., consolidated) from the channel 114-P to the channel 114-1. In this way, the operation of the application 116-1 and the application 116-M can be independent of the channel architecture.

In some embodiments, as described herein, the controller 110 can determine when an application has become inactive (e.g., dormant, disabled, removed, or otherwise less actively executing operations) and adjust a quantity of channels that are enabled and/or disabled to reduce power usage. When an application 116 is inactive, it may not be receiving data from a memory device 114 and/or it may not be receiving data as frequently. In such examples, the bandwidth demand (e.g., the aggregate bandwidth usage of the applications 116) may decrease, and the controller 110 can selectively disable some channels 114 to reduce the power usage of the memory system 104.

In other embodiments, the controller 110 can determine when an application has become active (e.g., a new application is connected to the host 102, a previously inactive application has become active, etc.) and adjust a quantity of channels 114 that are enabled and/or disabled to accommodate the bandwidth demand. When an application 116 is active, it may be receiving data from a memory device, the application 116 may be new to the computing system 100, and/or it may be requesting/receiving data frequently and/or at an increased frequency. In such examples, the bandwidth demand may increase, and the controller 110 can enable the channels 114 (e.g., previously disabled channels) to fulfil the bandwidth demand of the memory system 104.

Embodiments are not limited to approaches where channels are enabled to fulfil a bandwidth demand. In a non-limiting example, the applications 116 can be of differing levels of priority and can be ranked by the controller 110. The controller 110 can determine that the application 116-1 is a higher priority than the application 116-M. To conserve power, the memory system 104 may enable the channel 114-1 to provide data from the memory devices 112-1 to 112-N to the applications 116-1 and 116-N, and may selectively disable the channel 114-P. For example, the controller 110 may prioritize a request for data from the application 116-1 via the channel 114-1 ahead of a request from the application 116-M to receive data via the channel 114-1. In this way, the memory system 104 can reduce power consumption by refraining from enabling disabled channels 114-P to fulfil a bandwidth demand.

The controller 110 can communicate with the memory devices 112-1 to 112-N to control data read, write, and erase operations, among other operations. The controller 110 can include, for example, a number of components in the form of hardware and/or firmware, e.g., one or more integrated circuits, such as application-specific integrated circuit(s) (ASIC(s)), field-programmable gate array(s) (FPGA(s)), and/or software for controlling access to the number of memory devices 112-1 to 112-N and/or for facilitating data transfer between the host 102 and memory devices 112-1 to 112-N. The controller 110 can include various components not illustrated so as not to obscure embodiments of the present disclosure to control data read, write, erase, etc. operations. Such components may not be components of controller 110 in some embodiments, e.g., the components to control data read, write, erase, etc. operations can be independent components located within the memory system 104.

The memory devices 112-1 to 112-N can include a number of arrays of memory cells. The arrays can be flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes.

The memory devices 112 can include volatile memory and/or non-volatile memory. In a number of embodiments, memory devices 112 can include a multi-chip device. A multi-chip device can include a number of different memory types and/or memory modules. For example, a memory system can include non-volatile or volatile memory on any type of a module. In embodiments in which the memory devices 112 include non-volatile memory, the memory devices 112 can be flash memory devices such as NAND or NOR flash memory devices. Embodiments are not so limited, however, and the memory devices 112 can include other non-volatile memory devices such as non-volatile random-access memory devices (e.g., NVRAM, ReRAM, FeRAM, MRAM, PCM), "emerging" memory devices such as 3-D Crosspoint (3D XP) memory devices, etc., or combinations thereof. A 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation, where a non-volatile memory cell can be programmed without the non-volatile memory cell being previously erased.

The memory devices 112 can provide main memory for the computing system 100 or can be used as additional memory or storage throughout the computing system 100. Each memory device 112 can include one or more arrays of memory cells, e.g., volatile and/or non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the memory devices 112. It will be appreciated by those skilled in the art that the number of address input connections can depend on the density and architecture of the memory devices 112.

Figure 2:
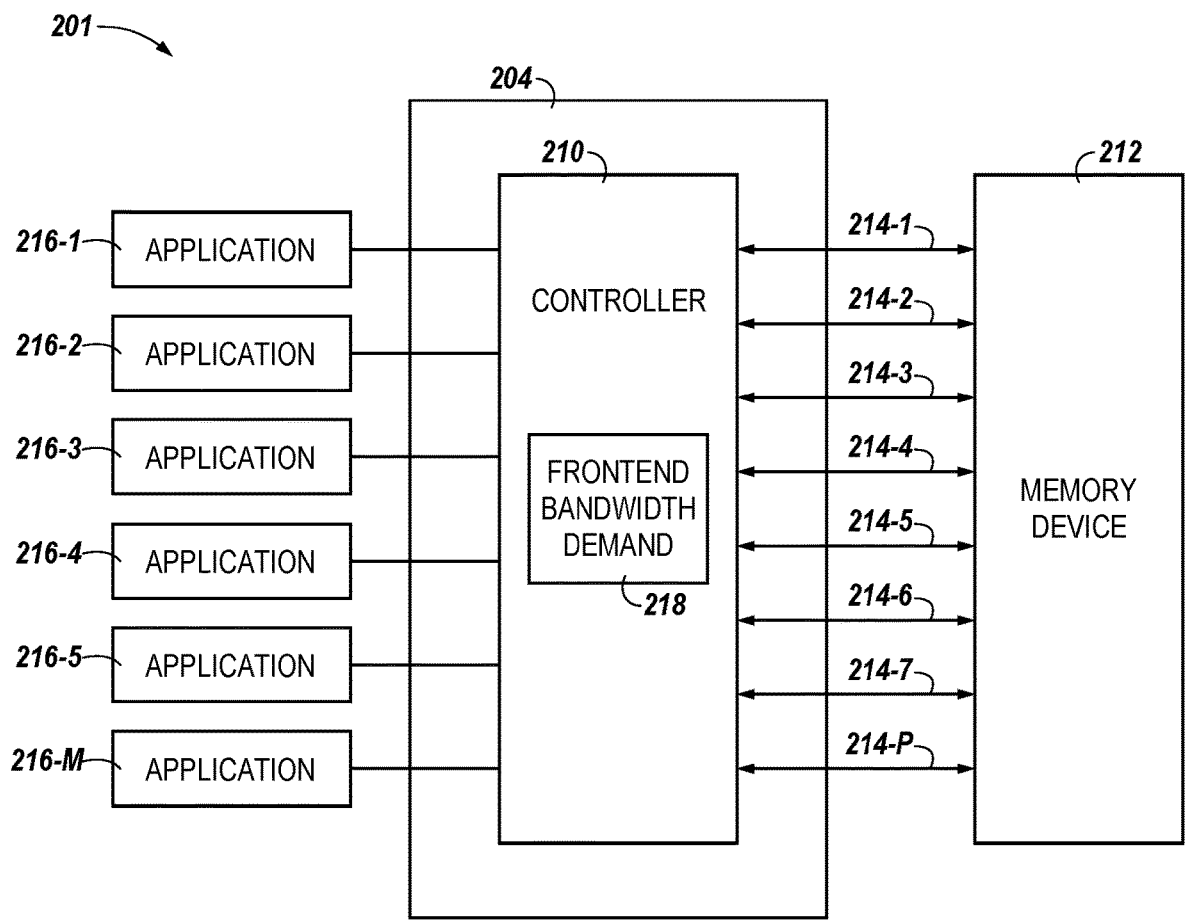
FIG. 2 is a functional block diagram in the form of an apparatus including a front end bandwidth demand in accordance with a number of embodiments of the present disclosure.

FIG. 2 is a functional block diagram in the form of an apparatus 201 including a front end bandwidth demand 218 in accordance with a number of embodiments of the present disclosure. The apparatus 201 can include applications 216-1, 216-2, 216-3, 216-4, 216-5, and 216-M which may be collectively referred to as applications 216 and be analogous to the applications 116 described in connection with FIG. 1. Although not illustrated as to not obscure the examples of the disclosure, the applications 216 may be executed on a host (e.g., the host 102 of FIG. 1). During execution of the applications, the applications may access data from a memory system 204 according to commands generated by a controller 210. The memory system 204 and the controller 210 may be analogous to memory system 104 and controller 110 described in connection with FIG. 1. The applications 216 can access data from one or more memory devices 212 which are analogous to the memory devices 112-1 to 112-N described in connection with FIG. 1. The memory device 212 can be included within the memory system 204 as illustrated by memory device 112 of FIG. 1, or external to the memory system 204 as illustrated in FIG. 2.

The channels 214-1, 214-2, 214-3, 214-4, 214-5, 214-6, 214-7, and 214-P can be collectively referred to as the channels 214 and can be analogous to the channels 114-1 to 114-P of FIG. 1. Data may be transferred via each of the channels 214 during execution of an individual application (e.g., the application 216-1, the application 216-2, etc.) and/or multiple applications 216-1 to 216-M. As described in more detail below, execution of the application(s) 216 can consume a threshold amount of bandwidth, which can be referred to herein as a "bandwidth demand" (e.g., the front end bandwidth demand 218, a back end bandwidth demand, etc.). As used herein, the term "back end" refers to a connection between the controller (e.g., the controller 210) and a device (e.g., a memory device 214 and/or another computing device). As used herein, the term "front end" refers to a connection between a controller (e.g., the controller 210) and a computing device (e.g., a host 102, an interface 108, and/or an application 116, etc.).

The front end bandwidth demand 218 can be an aggregate amount of bandwidth required to execute the applications 216. For example, because the channels 214 can draw power from the memory system 204 when the channels 214 are enabled to access data from the memory device 212 during execution of the applications 216, a front end bandwidth demand 218 may correspond to an amount of power drawn from the memory system 204 as a result of execution of the applications 216. In order to mitigate an amount of power drawn from the memory system 204, the controller 210 may monitor the front end bandwidth demand 218. The controller 210 can reduce power consumption by selectively disabling an individual channel 214 and/or a portion (e.g., a sub-set) of channels 214 based on the front end bandwidth demand 218. That is, in contrast to approaches in which each channel is generally active, embodiments herein can allow for an amount of power consumed in execution of applications to be reduced by selectively disabling one or more of the channels 214 based on the front end bandwidth demand 218.

In some embodiments, the amount of bandwidth used by each application 216 can be determined at least in part by the controller 210 determining an aggregate amount of bandwidth needed by all of the applications 216 executed by the host. Each of the applications 216 may include a different bandwidth demand, similar bandwidth demands, or combinations thereof, for execution. In a non-limiting example, application 216-1 can require 2 GB/s of bandwidth and application 216-2 can require 10 GB/s of bandwidth, while the remaining applications 216-3, 216-4, 216-5, 216-M are inactive. As such, the front end bandwidth demand 218 is the aggregate amount of bandwidth used by the channels 214 in providing data from the memory device 212 to execute applications 216-1 and 216-2 (e.g., 12 GB/s in this example). Because the remaining applications 216-3, 216-4, 216-5, and 216-M are inactive in this example, the controller 210 can selectively disable one or more channels 214 (e.g., channels that would be used by the applications 216-3, 216-4, 216-5, and 216-M if the applications 216-3, 216-4, 216-5, and 216-M were active) to reduce the amount of power used by the memory system 204, while fulfilling the front end bandwidth demand 218. Such power reductions can conserve resources, lower temperature, and increase efficiency of a computing system in comparison to approaches that do not allow for channels to be selectively disabled based on the front end bandwidth demand 218.

The controller 210 can selectively enable channels (e.g., previously disabled channels 214) when the front end bandwidth demand 218 increases. For example, the controller 210 may determine an aggregate amount of bandwidth used by applications 216-1 and 216-2 (e.g., the active applications) which are accessing data from memory device 212 via an individual channel 214-1, when channels 214-2, 214-3, 214-4, 214-5, 214-6, 214-7, and 214-P are disabled. Subsequently, the controller 210 can determine a different front end bandwidth demand 218 when new applications are added and/or become active. In a non-limiting example, applications 216-3 and 216-4 can be added and/or become active, and the front end bandwidth demand 218 may increase. In response to the increased front end bandwidth demand 218, the controller 210 can select a sub-set of channels from the disabled channels (e.g., the channels 214-2, 214-3, 214-4, 214-5, 214-6, 214-7, and 214-P) to fulfil the front end bandwidth demand 218 to execute the newly active applications 216-3 and 216-4. For example, the controller 210 can cause a sub-set of channels (e.g., the channels 214-2 and 214-3) to be enabled to provide data from memory device 212 to fulfil the front end bandwidth demand 218 including the newly active applications 216-3 and 216-4.

In some embodiments, the controller 210 can monitor the active applications 216-1, 216-2, 216-3, and/or 216-4 and identify when the applications 216 have become inactive. When active applications become inactive, the front end bandwidth demand 218 may decrease, and the controller 210 can disable a channel 214 and/or a sub-set of channels 214 to reduce power consumption. For example, the controller 210 can determine that applications 216-1 and 216-3 have become inactive. For example, during the operation of the memory system 204, the controller 210 can monitor application traffic originating front the host to determine whether an application (e.g., the application(s) 216) is active or inactive. That is, the controller 210 can determine if the applications 216-1 and 216-3 have exhibited a reduced bandwidth requirement as a result of no longer being executed. In this example, the controller 210 can determine which of the channels 214 correspond to execution of the applications 216-1 and 216-3 and disable the corresponding channels 214. Continuing with this example, if the application 216-1 is using the channel 214-1 to receive data from the memory device 212 and the application 216-3 is using the channel 214-3 to receive data from the memory device 212, the controller 210 may disable one (and consolidate the operations of the newly disabled channel) or both channels (e.g., the channels 214-1 and 214-3) to conserve power based on the determination that the applications 216-1 and 216-3 have exhibited a reduced bandwidth requirement due, for example, to no longer being active.

Figure 3:
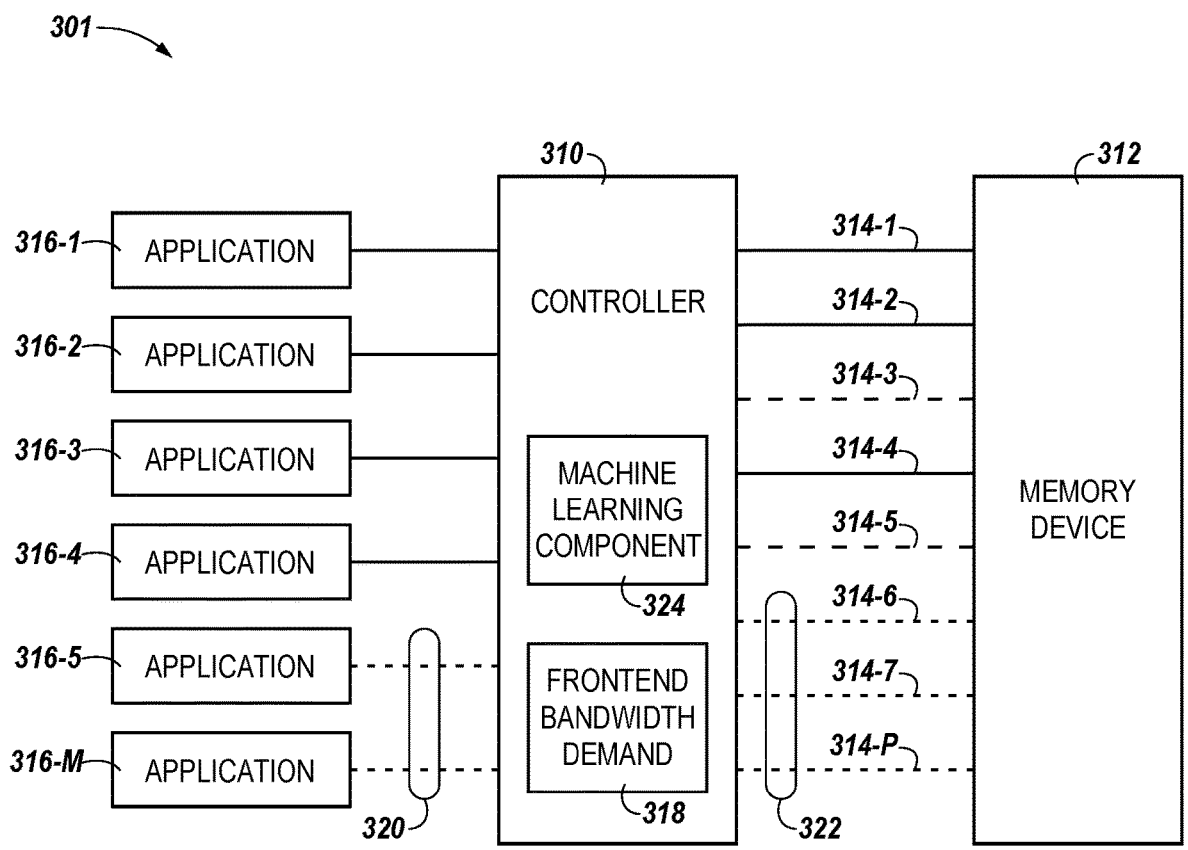
FIG. 3 is another functional block diagram in the form of an apparatus including a front end bandwidth demand in accordance with a number of embodiments of the present disclosure.

FIG. 3 is another functional block diagram in the form of an apparatus 301 including a front end bandwidth demand 318 and a machine learning component 324 in accordance with a number of embodiments of the present disclosure. Although not illustrated in FIG. 3 as to not obscure examples of the disclosure, the apparatus 301 can include a memory system that is analogous to the memory system 104 and 204 described in connection with FIGS. 1 and 2. The apparatus 301 can facilitate execute applications 316-1, 316-2, 316-3, 316-4, 316-5, and 316-M, which may be collectively referred to as applications 316 and be analogous to the applications 116 and 216 described in connection with FIGS. 1 and 2. Although not illustrated as to not obscure the examples of the disclosure, the applications 316 may be executed on a host (e.g., the host 102 of FIG. 1). Although not illustrated as to not obscure the examples of the disclosure, the applications 316 may be coupled to a memory system (e.g., the memory system 104 and 204 of FIGS. 1 and 2) and a controller 210 which is analogous to controller 110 and 210 described in connection with FIGS. 1 and 2.

The applications 316 can receive data from one or more memory devices 312 which are analogous to the memory devices 112 and 212 described in connection with FIGS. 1 and 2. The applications 316 can receive data from the memory device 312 via channels 314-1, 314-2, 314-3, 314-4, 314-5, 314-6, 314-7, and 314-P which can be collectively referred to as the channels 314 and can be analogous to the channels 114 and 214 described in connection with FIGS. 1 and 2. The memory device 312 can be included within the memory system, or can be external to the memory system.

The front end bandwidth demand 318 can be an aggregate of the amount of bandwidth used by the channels 314 to provide data to the applications 316 from the memory device 312 during execution of the application 316. The controller 310 can determine an amount of bandwidth used by each of the applications 316 based, at least in part, on the aggregate amount of bandwidth used to execute the applications 316. For example, the controller 310 can determine a front end bandwidth demand 318, and based on the quantity of active applications 316, determine which applications 316 are requiring bandwidth and/or are of a higher priority.

As shown in FIG. 3, the controller 310 may also include a machine learning component 324. The machine learning component 324 can include, for example, a number of components in the form of hardware and/or firmware, e.g., one or more integrated circuits, such as application-specific integrated circuit(s) (ASIC(s)), and/or field-programmable gate array(s) (FPGA(s)), to monitor application bandwidth demands and/or learn application bandwidth behavior over time.

The controller 310 and/or the machine learning component 324 can be configured to determine an aggregate bandwidth usage of the applications 316 accessing data from the memory device 312 coupled to the controller 310 via the channels 314. The controller 310 may identify a portion of the channels 314 used to access the data and selectively disable a sub-set 322 of the portion of the channels 314 based, at least in part on the aggregate bandwidth usage of the applications 316. The portion of the channels 314 may include all of the channels 314-1, 314-2, 314-3, 314-4, 314-5, 314-6, 314-7, and 314-P or some of the channels (e.g., the channels 314-1, 314-3, and 314-7 although embodiments are not limited to disabling these particular channels). The controller 310 may determine that the front end bandwidth demand 318, which can represent the aggregate bandwidth usage of the applications 316, can be provided by a quantity of channels 314 that is less than the portion of channels 314 supplying the data to the applications 316. Responsive to this determination, the controller 310 can disable the subset 322 of channels 314 to conserve power. In a non-limiting example, the sub-set 322 of channels are illustrated as channels 314-6, 314-7, and 314-P, indicated by the broken circle.

In some embodiments, applications 316 may access data via the channels 314-6, 314-7, and 314-P prior to the controller 310 disabling the subset 322 including the channels 314-6, 314-7, 314-P. In such an example, the applications 316 utilizing the channels 314-6, 314-7, and 314-P can be transferred to a number of enabled channels (e.g., 314-1, 314-2, 314-3, 314-4, and/or 314-5).

In some embodiments, the one or more channels 314 from the sub-set 322 can be selectively disabled by the controller 310 responsive to an indication from the machine learning component 324. The indication from the machine learning component 324 can include information corresponding to an application 316 being removed from communication with the controller 310. For example, the applications 316 may be running on a host (e.g., the host 102 of FIG. 1) and connected to the controller via an interface (e.g., the interface 108 of FIG. 1). An application 316 can be removed from communication with the controller 310 when the application 316 is no longer used, has been replaced, is outdated, defunct, etc.

The machine learning component 324 can indicate to the controller 310 information corresponding to a reduction in an amount of power used by the applications 316. A reduction in an amount of power can indicate that an application 316 has been removed from communication with the controller 310 and/or that an application 316 is accessing (e.g., requesting to access) less data from the memory device 312 via a controller 314 than previously (e.g., the application 316 may be less active). The controller 310 can receive the indication from the machine learning component 324 in the form of signaling.

For example, the controller 310 can receive signaling (e.g., an alert) that indicates when one or more applications 316-5 and 316-M have ceased to receive data from the memory device 312. The signaling received by the controller 310 may prompt the controller 310 to aggregate the amount of bandwidth used to operate the applications 316 and determine a new front end bandwidth demand 318. Responsive to a new front end bandwidth demand 318, the controller 310 may disable a sub-set 322 of channels 314 to reduce power consumption. The machine learning component 324 and/or the controller 310 can determine when an application 316 has increased activity and/or when a new application 316 has been added to communicate with the controller 310 and access data via a channel 314.

The controller 310 can receive an indication and/or an alert generated by the machine learning component 324 responsive to a detected increase in front end bandwidth demand 318. An application 316 can increase the front end bandwidth demand 318 when it increases in activity (e.g., when the application 316 increases an amount of data accessed from the memory device). Activity of an application 316 can increase when the application 316 is connected to the controller 310 (e.g., a new application is added to communicate with the controller 310), or the application 316 is accessing data form the memory device 312 more frequently. The alert received by the controller 310 may prompt the controller 310 to aggregate the amount of bandwidth used to execute the applications 316 and determine a new front end bandwidth demand 318 to reflect the increase in activity of the application 316. Responsive to a new front end bandwidth demand 318, the controller 310 may re-enable the sub-set 322 of channels 314 (or a portion of the sub-set 322) to accommodate the new front end bandwidth demand 318. In some embodiments, the machine learning component 324 may include circuitry of the controller 310 that can monitor the applications 316 for changes in power requirements (e.g., new applications added, applications removed, and/or increases and decreases in activity levels of the applications 316).

The machine learning component 324 can anticipate a front end bandwidth demand 318 such that the controller 310 can enable and/or disable channels 314 to fulfil the front end bandwidth demand 318 and conserve power. In a non-limiting example, the machine learning component 324 can monitor the applications 316-1, 316-2, 316-3, 316-4, 316-5, and 316-M and determine that a portion of the applications 320 (including the applications 316-5 and 316-M) are active (e.g., newly connected to the controller 310 and/or accessing data from the memory device 312). The machine learning component 324 can transmit an indication to the controller 310, and the controller 310 can aggregate the bandwidth used by the applications to determine a front end bandwidth demand 318. The machine learning component 324 can identify the sub-set 322 of channels disabled by the controller 310 based, at least in part, on an anticipated amount of power required in operation of the channels 314 during execution of the portion of applications 320. Based on the determination of the machine learning component 324, the controller 310 can re-enable the sub-set 322 of channels based at least in part on the anticipated amount of power when the portion of the applications 320 are included in the front end bandwidth demand 318.

Figure 4:
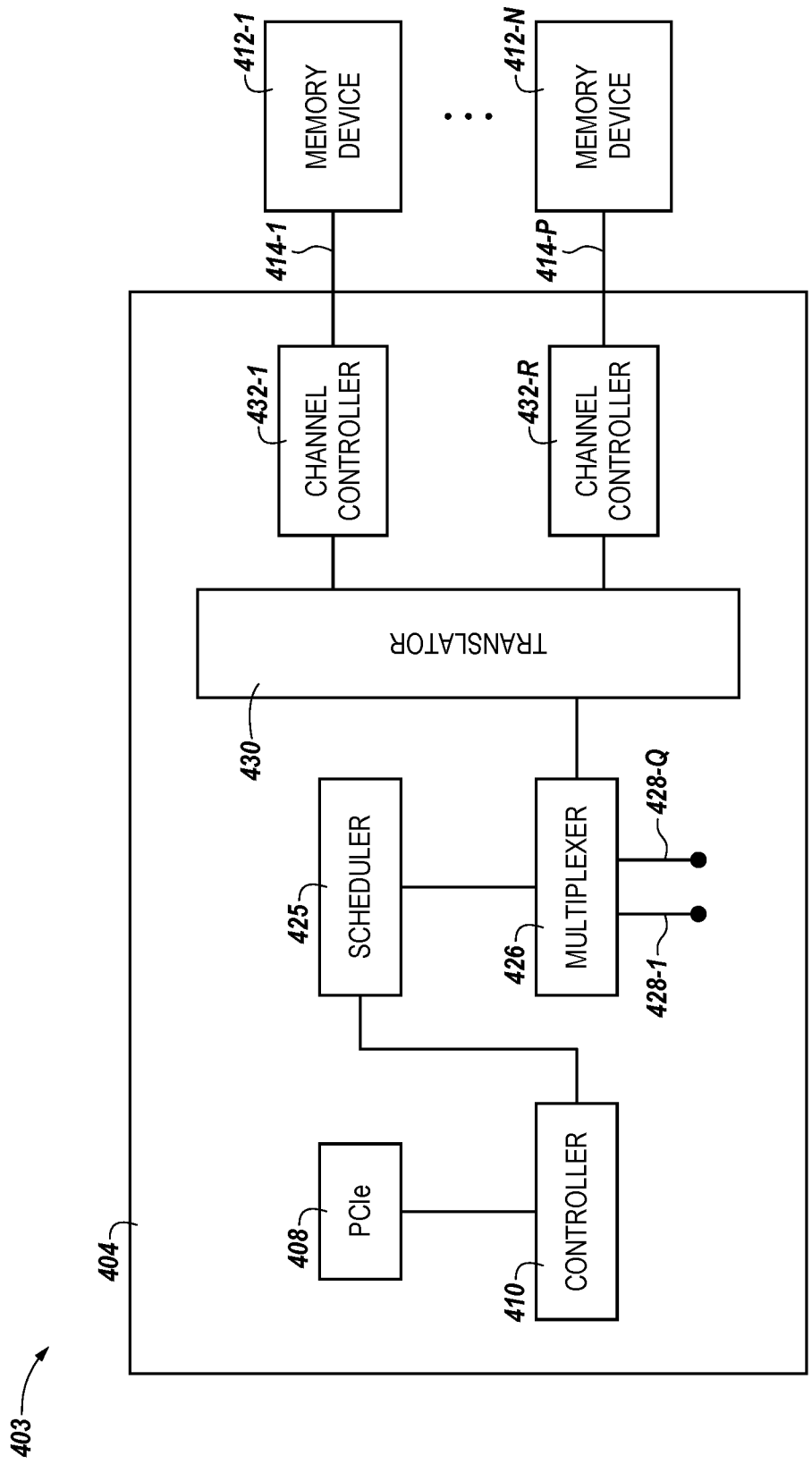
FIG. 4 is another functional block diagram in the form of a computing system including a memory system in accordance with a number of embodiments of the present disclosure.

FIG. 4 is another functional block diagram in the form of a computing system 403 including a memory system 404 in accordance with a number of embodiments of the present disclosure. The computing system 403 can be similar to the computing system 100 described in connection with FIG. 1. As shown in FIG. 4, the computing system 403 includes a memory system 404, and a controller 410 which are analogous to the memory systems 104, 204, and the controller 110, 210, and 310, described in connection with FIGS. 1, 2, and 3. In addition, FIG. 4 illustrates memory devices 412-1 to 412-N (which may be collectively referred to as memory devices 412 and can be analogous to the memory devices 112, 212, and 312 described in connection with FIGS. 1, 2, and 3

Although not illustrated in FIG. 4, the memory system 404 may be connected to a host (e.g., the host device 102 described in connection with FIG. 1). The memory system 404 can further include an interface, such as the peripheral interconnect express (PCIe) interface. Although the interface illustrated in FIG. 4 is shown as a PCIe 408, it will be appreciated that other interfaces, buses, an/or communication paths may be used without departing from the spirit of the disclosure. The PCIe 408 can be used to connect a host to the memory system 404. Further, although not illustrated in FIG. 4 as to not obscure examples of the disclosure, applications (e.g., applications 116, 216, and 316 described in connection with FIGS. 1, 2, and 3) can be executed (e.g., run on) the host. The applications can be communicatively connected to the controller 410 via the PCIe 408.

The controller 410 may include a front end bandwidth demand (e.g., the front end bandwidth demand 218 and 318 described in connection with FIGS. 2 and 3). As described above, the front end bandwidth demand can be an aggregate of the amount of bandwidth used by the channels 414-1 to 414-P to provide data to the applications from the memory devices 412 during execution of the applications by the host. The controller 410 can reduce and/or increase the amount of power used by the memory system 404 by selectively disabling and/or selectively enabling the channels 414-1, to 414-P based at least in part on the front end bandwidth demand.

The scheduler 425 can be provisioned with computing resources and circuitry to orchestrate execution of the applications. For example, the scheduler 425 can queue requests for data from the applications. In some examples, the controller 410 may determine a priority level of the applications to conserve power and the scheduler 425 may facilitate the priority of the requests based the determination of the controller 410. Low priority applications may include applications that request data less frequently compared to high priority applications and/or may not be critical applications. A high priority application may include applications that frequently request data compared to low priority applications and/or may be critical to operation of the host and/or the memory system 404. For example, some high priority applications may request data from the memory devices 412 infrequently but the data when executed may be critical to operation of the host and/or the memory system 404.

The controller 410 may selectively disable a portion of the channels 414-1 to 414-P to conserve power, and the scheduler 425 may prioritize the retrieval of data from high priority applications over the retrieval of data for lower priority applications. Said differently, the controller 410 may induce a latency in lower priority applications to conserve power for the memory system 404. The scheduler 425 may be coupled to a multiplexer 426 and selection pins 428-1 and 428-Q. The multiplexer 426 can be a device that selects between analog and digital input signals received by the selection pins 428-1 and 428-Q and forwards the input signal to an output line (e.g., connected to translator 430).

The translator 430 can receive a selection command from the multiplexer 426 that can cause one or more of the channels 414-1 to 414-P are to be selectively enabled or disabled. The channel controllers 432-1 to 432-R can be coupled to the channels 414-1 to 414-P and can switch corresponding channels 414-1, 414-P to an enabled or disabled state responsive to a command or other output from the translator 430.

As described above, in some embodiments, the controller 410 can determine an amount of bandwidth consumed in execution of respective applications executed on the host. The amount of bandwidth consumed can be aggregated to a front end bandwidth demand received by the controller 410. The scheduler 425 may determine a queue of the data requests based on the front end bandwidth demand, a priority of the applications, and/or a signal from the controller 410. The controller 410 can then selectively assert a signal to pins 428-1 to 428-Q coupled to the multiplexer 426 to cause a respective channel controller 432-1 to 432-R to switch a corresponding channel 414-1 to 414-P to an enabled or disabled state responsive to the asserted (or de-asserted) signal).

In some embodiments, the signal(s) asserted to the selection pins 428-1 and 428-Q can be Boolean logical signals (e.g., signals that have a logical value of "0" or a logical value of "1"). If there are two selection pins 428-1 and 428-Q, as shown in FIG. 4, four possible combinations of values can be asserted on the selection pins 428-1 and 428-Q. For example, a logical value of "0" can be asserted on both of the selection pins 428-1 and 428-Q, which corresponds to the channels 414-1 and 414-P being disabled. Similarly, if a logical value of "1" is asserted on both of the selection pins 428-1 and 428-Q, both the channels 414-1 and 414-P can be enabled. Mixed value signals (e.g., a logical value of "0" being asserted on the selection pin 428-1 while a logical value of "1" is asserted on the selection pin 428-Q, or vice versa) can result in one of the channels 414-1 or 414-P being enabled. Embodiments are not limited to the above enumerated scenarios and greater than or fewer than two selection pins 428 may be provided in the memory device 404.

The selection pins 428-1 to 428-Q can correspond to different channels 414-1 to 414-P. In some embodiments, the selection pin 428-1 can correspond to the channel 414-1 and the second selection pin 428-Q can correspond to the channel 414-P. In such embodiments, the controller 410 can de-assert a signal to the selection pin 428-1 (e.g., the controller 410 can assert a logical value of "0" on the selection pin 428-1) corresponding to the channel 414-1 which may be utilized by an application. The translator 430 may receive a signal corresponding to the de-asserted signal corresponding to the channel 414-1 and transmit a signal to the channel controller 432-1 to disable the channel 414-1.

Based on the de-assertion signal of the controller 410, the channel controller 432-1 can transfer the access of data from memory device 412-1 for the application corresponding to the channel 414-1 to the channel 414-P. In this way, the controller 410 can transfer the execution operation for the application corresponding to the channel 414-1 to the channel 414-P responsive to the de-assertion of the signal to the selection pin 428-1.

The controller 410 can cause the independent operation of the selection pins 428-1 to 428-Q coupled to the multiplexer 426. In some embodiments, the controller 410 can disable channel 414-1 by de-asserting the signal to the selection pin 428-1 and assert a different signal to the selection pin 428-Q, as described above. The assertion of the different signal to the selection pin 428-Q is independent of the de-asserted signal to the selection pin 428-1 such that the selection pin 428-Q refrains from altering its operation responsive to the de-asserted selection pin 428-1. For example, the controller 410 can determine to disable one or more channels 414-1 to 414-P and transfer data access to a different enabled channel. In some embodiments, when data access is transferred to the different enabled channel, the media management logic of the application corresponding to the disabled channel (e.g., encryption, etc.) can be conserved when the operations are transferred. In this way, the controller 410 can cause the selective independent operation of the selection pins 428-1 to 428-Q to enable and disable the channels 414-1 and 414-P. Said differently, the assertion or de-assertion of the selection pins 428-1 to 428-Q may not affect the operation of the enabled channels.

Figure 5:
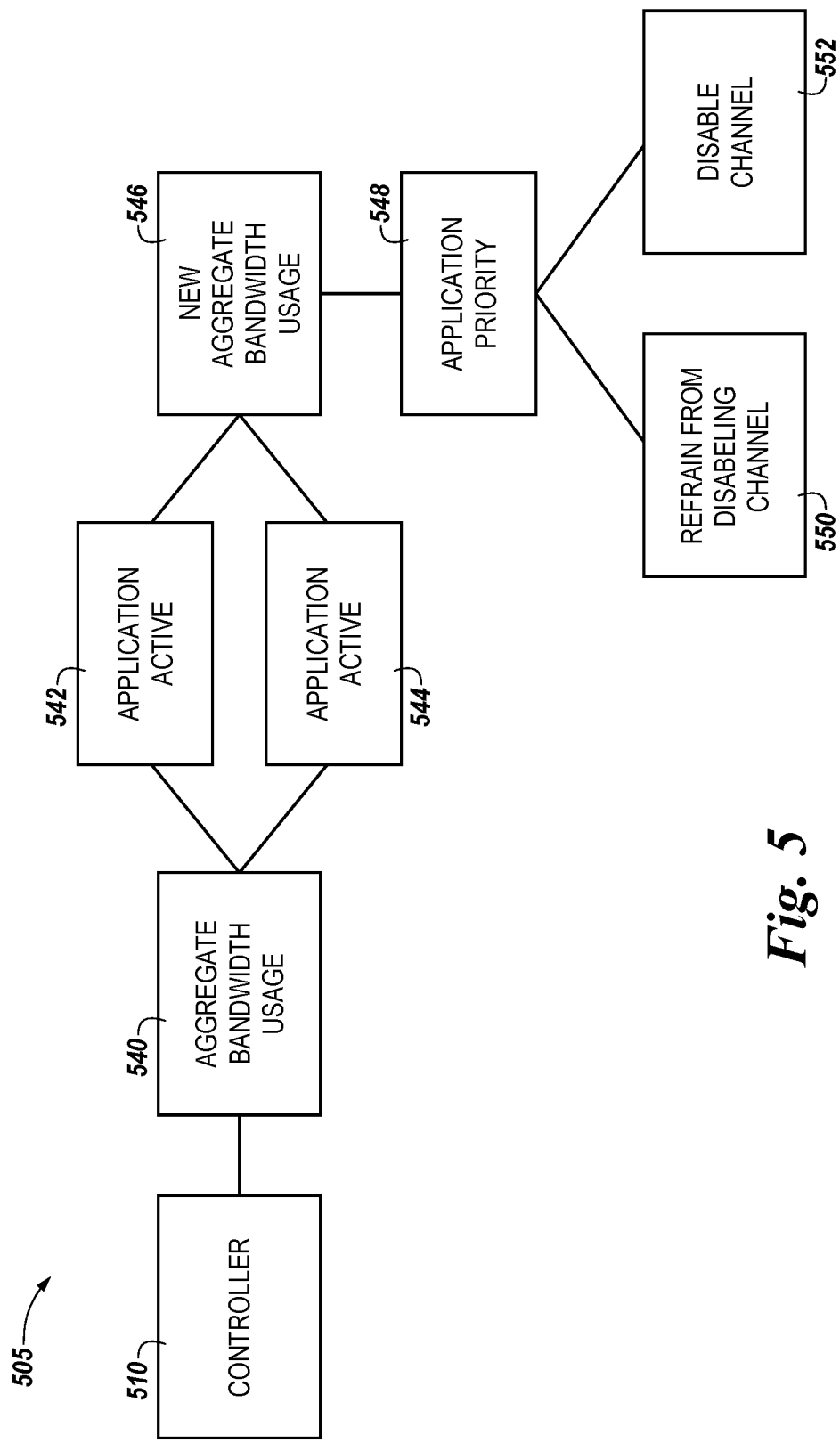
FIG. 5 is a flow diagram for channel architecture for memory devices in accordance with a number of embodiments of the present disclosure.

FIG. 5 is a flow diagram 505 for channel architecture for memory devices in accordance with a number of embodiments of the present disclosure. The flow diagram 505 includes a controller 510 which is analogous to the controller 110, 210, 310, and 410 described in connection with FIGS. 1, 2, 3, and 4.

At block 540, the controller 510 can be configured to aggregate a bandwidth usage. The bandwidth usage may be aggregated by the controller 510 as a front end bandwidth demand (e.g., the front end bandwidth demand 218 and 318 of FIGS. 2 and 3) and be an aggregate of the amount of bandwidth used by channels (e.g., channels 114, 214, 314, and 414 of FIGS. 1, 2, 3, and 4) to provide data to the applications (e.g., applications 116, 216, and 316, of FIGS. 1, 2, and 3) from the memory device (e.g., memory device 112, 212, 312, and 412 of FIGS. 1, 2, 3, and 4) during execution of applications.

The controller 510 can aggregate a bandwidth usage periodically or responsive to an indication and/or an alert. The aggregation of bandwidth at 540 may be used to determine a number of channels to selectively enable (to provide increased bandwidth to applications) or selectively disable (to conserve power and/or lower temperature). The controller 510 can receive an indication from a machine learning component (e.g., the machine learning component 324 of FIG. 3) that an application has been added to the computing system (e.g., coupled to the host), and/or an application has been disabled (e.g., removed, dormant, or is no longer being executed). This indication may prompt the controller 510 to aggregate bandwidth usage to determine if the controller 510 can selectively disable channels from the computing system.

In some embodiments, the controller 510 can receive an alert related to a temperature of the computing system that can prompt the controller 510 to aggregate bandwidth usage in execution of applications to determine if a power usage of a number of enabled channels can be decreased. Temperature can increase when applications are added to the computing system and/or multiple channels are enabled. For example, at box 542, the controller may determine the applications that are active (e.g., receiving data from the memory devices) and at block 544, determine which application are inactive. Because temperature increases can decrease efficiency of the computing system (e.g., the memory device coupled to the computing system), by selectively disabling one or more channels to reduce the amount of power consumed by a computing system, improved performance of the computing system may be realized in comparison to approaches in which channels are not selectively disabled based on the aggregate bandwidth usage corresponding to execution of applications.

In some embodiments, an inactive application (e.g., the inactive applications 544) can become active (e.g., the active applications 542) which may increase a power usage and/or increase the temperature of the computing system. To maintain efficiency, the controller 510 may determine if power consumption (e.g., power consumed by enabled channels) can be reduced. For example, the controller 510 can receive an alert corresponding to a temperature increase in a memory device coupled to the controller 510 corresponding to execution of an application. Responsive to the alert, the controller 510 can determine, at box 546, a new aggregate bandwidth usage corresponding to execution of the applications.

The controller 510 can use the new aggregate bandwidth usage to determine if the temperature can be decreased by selectively disabling one or more channels and/or consolidating the execution of applications. As described above, part of the determination by the controller 510 may be based on a priority of the applications. For example, at block 548, the controller 510 can determine a priority of the applications whose execution comprise the new aggregate bandwidth usage determined at block 546.

In some embodiments, the applications may be of a high priority where the controller 510 directs a scheduler (e.g., the scheduler 425 of FIG. 4) to handle requests for data from the applications as high priority. Said differently, the requests for data to execute the application(s) can be accommodated as they are received as opposed to creating a latency to execute some applications before others. In such an embodiment, at block 550, the controller 510 can refrain from disabling one or more channels. In this way, multiple channels can remain available to provide data from the memory device to the applications.

In some embodiments, one or more of the applications may be of a low priority where the controller 510 directs a scheduler (e.g., the scheduler 425 of FIG. 4) to cause the applications to be executed based on the priority of the applications. For example, the scheduler can create a queue with the high priority applications executed first and lower priority applications executed subsequently to the high priority applications. Said differently, the requests for data to execute the applications can be accommodated based on priority by creating a latency between execution of applications such that some applications are executed before others based on the priority of the applications. In such an embodiment, at block 552, the controller 510 can disable one or more channels, as described above. In this way, power usage and/or temperature can be decreased. In other words, the controller 510 can determine if it is more important to decrease power and/or lower temperature or handle the execution of all of the applications with the same level of priority.

Figure 6:
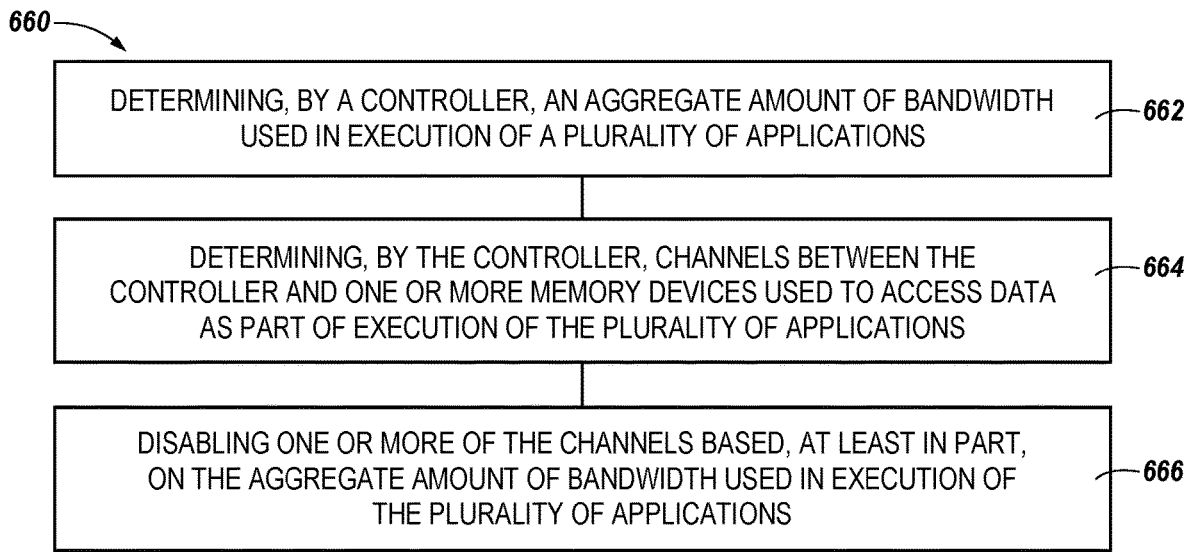
FIG. 6 is a flow diagram representing an example method for channel architecture for memory devices in accordance with a number of embodiments of the present disclosure.

FIG. 6 is a flow diagram representing an example method 660 of channel architecture for memory devices in accordance with a number of embodiments of the present disclosure. At block 662, the method 660 can include determining, by a controller, an aggregate amount of bandwidth used in execution of one or more applications. The controller and applications can be analogous to the controller 110 and the applications 116 discussed in connection with FIG. 1 herein.

At block 664, the method 660 can include determining, by the controller, channels between the controller and one or more memory devices used to access data as part of an execution of the applications. The channels can be analogous to the channels 114 of FIG. 1. The amount of bandwidth determined by the controller can be a front end bandwidth demand (e.g., the front end bandwidth demand 318 of FIG. 3) which can be an aggregate of the amount of bandwidth used by the channels to provide data to the applications from the memory device during execution of the applications.

At block 666, the method 660 can include disabling one or more of the channels based at least in part on the aggregate amount of bandwidth used in execution of the plurality of applications. The controller may selectively disable channels that allow data access between the memory devices and the applications. The enabled channels may have the capacity to provide data to more than one application, as such, the controller may consolidate the provisioning of data from multiple applications to a portion of channels and selectively disable a sub-set (e.g., the sub-set 322 of FIG. 3) of channels.

In some embodiments, the method 660 can include the controller determining that a new application has been executed by the host and is requesting data from a memory device coupled via a back end channel. In such embodiments, the method 660 can include determining a new aggregate amount of bandwidth used by the applications (including the newly connected application). The controller can selectively re-enable at least one of the sub-set of channels that had been previously disabled to accommodate the new aggregated amount of bandwidth needed to execute the applications. The method 660 can include the controller managing the channels between the controller and the one or more memory devices based at least in part on the new aggregate amount of bandwidth.

In some embodiments, the method 660 can include receiving, by the controller, signaling that indicates a temperature increase in a memory device coupled to the controller corresponding to the execution of the additional application and/or determining, by the controller, a new aggregate amount of bandwidth used to execute the plurality of applications based at least in part on the signaling. In response to the alert, the method 660 can further include selectively disabling another portion of channels by the controller.

Figure 7:
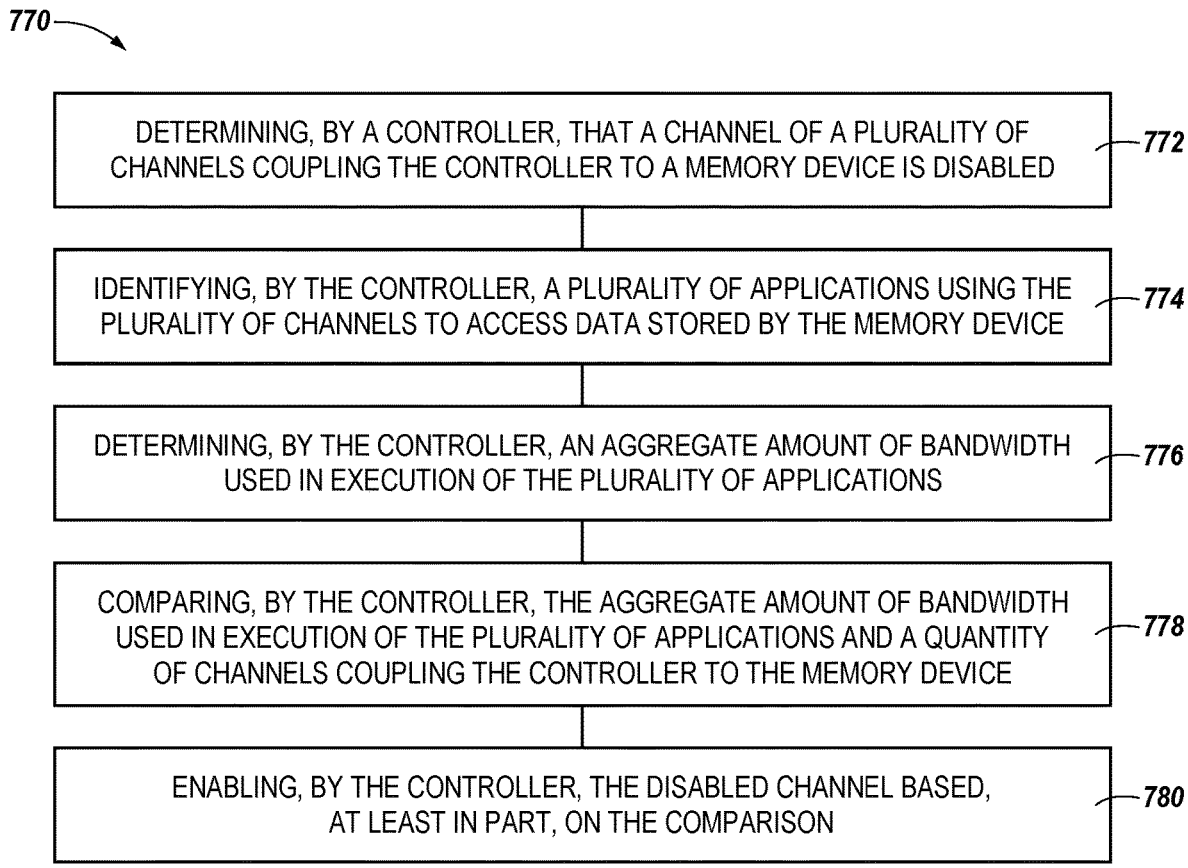
FIG. 7 is another flow diagram representing an example method for channel architecture for memory devices in accordance with a number of embodiments of the present disclosure.

FIG. 7 is another flow diagram representing another example method 770 for channel architecture for memory devices in accordance with a number of embodiments of the present disclosure. At block 772, the method 770 can include determining, by a controller, that a channel coupling the controller to a memory device is disabled. The controller can be analogous to the controller 110 discussed in connection with FIG. 1, herein. A disabled channel may be coupled to the controller and the memory device but not usable for transmission of data from the memory device to an application (e.g., the application 116 of FIG. 1). A disabled channel may be utilizing a small amount of power while an enabled channel may draw a comparatively large amount of power.

At block 774, the method 770, can include identifying, by the controller, applications using the channels to access data stored by the memory device. The applications can be analogous to the applications 116 discussed in connection with FIG. 1, herein. The identified channels may be a portion of channels that are enabled to transmit data to the applications such that the applications may be executed on a host (e.g., the host 102 of FIG. 1) coupled to the controller. As described above, the enabled channels may be using an amount of power from the memory system (e.g., the memory system 104 of FIG. 1).

At block 776, the method 770, can include determining, by the controller, an aggregate amount of bandwidth used in execution of the applications. The aggregate amount of bandwidth can include the amount of bandwidth used by each application to execute using data provided via each channel from the memory device to its respective application. In some embodiments, there can be more than one application using each channel. The aggregate amount of bandwidth can be determined by the controller and be referred to as a front end bandwidth demand (e.g., the front end bandwidth demand 318 of FIG. 3). The aggregate amount of bandwidth can be determined periodically, and/or responsive to an alert (e.g., temperature alert, etc.), an indication (e.g., that an application is active and/or inactive, added and/or removed from communication with the controller, etc.). In some embodiments, the method 770 can include, determining, by the controller an increase in the aggregate amount of bandwidth used in the execution of the of applications. The increase in aggregate bandwidth can correspond to at least one application exhibiting an increased bandwidth requirement. Embodiments are not so limited, however, and in some embodiments, the controller can also detect a decrease in bandwidth (e.g., a decrease in aggregate amount of bandwidth used).

In some embodiments, the method 770 can include determining a decrease in the aggregate amount of bandwidth used in execution of the applications and associate each application to respective channels. Further, the controller can disable a portion of the channels based in part on a bandwidth requirement of the applications. Said differently, the controller can determine that more channels are enabled than are necessary to accommodate the bandwidth requirement (e.g., the front end bandwidth demand) of the applications. As such, the controller can selectively disable a portion (e.g., one or more) of the enabled channels to save power, thereby reducing a temperature of the memory device. The controller can transfer the applications that were previously accessing data via the newly disabled channels to enabled channels (e.g., consolidation). This channel consolidation can be accomplished in an independent manner where disabling one or more channels of the plurality of channels can include (e.g., disabling the portion of the channels) refrains from altering the operation of remaining enabled channels.

At block 778, the method 770, can include comparing, by the controller, the aggregate amount of bandwidth used in the execution of the applications and a quantity of channels coupling the controller to the memory device. In some embodiments, the controller can compare the applications accessing data to the quantity of enabled channels to determine if some channels may be disabled to save resources. In other embodiments, the controller can compare the applications accessing data to the quantity of enabled applications to determine if there are enough channels enabled to provide data efficiently to the applications.

At block 780, the method 770, can include enabling, by the controller, a disabled channel based at least in part on the comparison. To avoid unwanted latency in the execution of applications the controller may enable channels that had been previously disabled to increase the access of data from the memory devices. The enabling of previously disabled channels provides additional connection to the memory device for the applications to access data stored by the memory device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. An apparatus, comprising:
   an interface; and
   a controller coupled to the interface and a plurality of channels, wherein the controller is configured to:
      determine an aggregate amount of front end bandwidth used by a plurality of applications running on a host computing system and accessing data from a memory device coupled to the controller via the plurality of channels;
      determine, based on the aggregate amount of front end bandwidth used by the plurality of applications running on the host computing system, a front end bandwidth demand for the plurality of applications;
      assert respective Boolean signals on respective pins coupled to respective channels among the plurality of channels to disable one or more channels of the plurality of channels based, at least in part, on the aggregate amount of front end bandwidth used by the plurality of applications and an output of a Boolean operation resulting from assertion of the respective Boolean signals on the respective pins;
      select a sub-set of channels from a portion of disabled channels responsive to the front end bandwidth demand; and
      enable the sub-set of channels to fulfil the front end bandwidth demand.

2. The apparatus of claim 1, wherein the plurality of channels comprise a plurality of back end channels of the controller.

3. The apparatus of claim 1, wherein the controller is further configured to cause the plurality of applications to access the data from channels among the plurality of channels that remain enabled subsequent to disabling the one or more channels of the plurality of channels.

4. The apparatus of claim 1, wherein the controller is further to:
   determine that a portion of the plurality of applications are inactive, wherein the portion of the plurality of applications correspond to the sub-set of channels; and
   disable the sub-set of channels responsive to the determination that the portion of the plurality of applications are inactive.

5. The apparatus of claim 1, wherein the controller is further configured to determine an amount of front end bandwidth used by each application based, at least in part, on the aggregate amount of front end bandwidth used by the plurality of applications.

6. The apparatus of claim 1, wherein the one or more channels of the plurality of channels are disabled responsive to an indication from a machine learning component coupled to the controller.

7. The apparatus of claim 6, wherein the indication comprises information corresponding to an application of the plurality of applications being removed from communication with the interface.

8. The apparatus of claim 6, wherein the indication comprises information corresponding to a reduction in an amount of front end bandwidth used by the application of the plurality of applications.

9. An apparatus, comprising:
   an interface; and
   a controller coupled to the interface and a plurality of channels, wherein the controller is configured to:

determine an aggregate front end bandwidth usage of a plurality of applications running on a host computing system and accessing data from a memory device coupled to the controller via the plurality of channels;
determine, based on the aggregate amount of front end bandwidth used by the plurality of applications running on the host computing system, a front end bandwidth demand for the plurality of applications;
identify one or more channels of the plurality of channels used to access the data;
assert respective Boolean signals on respective pins coupled to respective channels among the plurality of channels to disable a sub-set of the one or more channels of the plurality of channels based, at least in part, on the aggregate front end bandwidth usage of the plurality of applications running on the host computing system and an output of a Boolean operation resulting from assertion of the respective Boolean signals on the respective pins;
select the disabled sub-set of channels responsive to the front end bandwidth demand; and
enable the sub-set of channels to fulfil the front end bandwidth demand.

10. The apparatus of claim 9, wherein the controller receives a signal that indicates that at least one application has ceased to receive data from the memory device.

11. The apparatus of claim 9, wherein the controller includes a machine learning component configured to anticipate an amount of front end bandwidth consumed in execution of at least one of the plurality of applications.

12. The apparatus if claim 11, wherein the machine learning component is further configured to identify the sub-set of the one or more channels based, at least in part, on the anticipated amount of front end bandwidth of the at least one of the plurality of applications.

13. The apparatus of claim 11, wherein the machine learning component is further configured to cause the sub-set of the one or more channels to be re-enabled based, at least in part, on the anticipated amount of front end bandwidth of the at least one of the plurality of applications.

14. A method, comprising:
determining, by a controller, an aggregate amount of front end bandwidth used in execution of a plurality of applications running on a host computing system;
determining, based on the aggregate amount of front end bandwidth used by the plurality of applications running on the host computing system, a front end bandwidth demand for the plurality of applications;
determining, by the controller, channels between the controller and one or more memory devices used to access data as part of execution of the plurality of applications;
asserting respective Boolean signals on respective pins coupled to respective channels among the channels to disabling one or more of the channels based, at least in part, on the aggregate amount of front end bandwidth used in execution of the plurality of applications running on the host computing system and an output of a Boolean operation resulting from assertion of the respective Boolean signals on the respective pins;
selecting a sub-set of channels from a portion of disabled channels responsive to the front end bandwidth demand; and
enabling the sub-set of channels to fulfil the front end bandwidth demand.

15. The method of claim 14, comprising:
determining, by the controller, that an additional application is executed;
determining, by the controller, a new aggregate amount of front end bandwidth used by the plurality of applications, wherein the new aggregate amount of front end bandwidth includes the front end bandwidth required to execute the additional application; and
managing the channels between the controller and the one or more memory devices based at least in part on the new aggregate amount of front end bandwidth.

16. The method of claim 15, comprising re-enabling at least one of the channels, by the controller, to accommodate the new aggregated amount of front end bandwidth.

17. The method of claim 14, comprising:
receiving, by the controller, signaling that indicates a temperature increase in a memory device coupled to the controller corresponding to the execution of the additional application; and
determining, by the controller, a new aggregate amount of front end bandwidth used to execute the plurality of applications based at least in part on the signaling.

18. The method of claim 17, comprising disabling another channels, by the controller, responsive to the signaling that indicates the temperature increase.

19. A method, comprising:
determining, by a controller, that one or more channels of a plurality of channels coupling the controller to a memory device are disabled;
identifying, by the controller, a plurality of applications using the plurality of channels to access data stored by the memory device;
determining, by the controller, an aggregate amount of front end bandwidth used by a host computing system in execution of the plurality of applications;
determining, based on the aggregate amount of front end bandwidth used by the plurality of applications running on the host computing system, a front end bandwidth demand for the plurality of applications;
comparing, by the controller, the aggregate amount of front end bandwidth used in execution of the plurality of applications or the front end bandwidth demand for each of the plurality of applications and an amount of bandwidth available to each of a quantity of channels coupling the controller to the memory device;
selecting a sub-set of channels from a portion of the disabled channels responsive to the front end bandwidth demand; and
enabling, by the controller, the sub-set of disabled channels based, at least in part, on the determined aggregate amount of front-end bandwidth used in execution of the plurality of application and on the comparison by assertion of a Boolean signal having a particular value to a selection pin coupled to the controller, wherein:
enabling the sub-set of disabled channels provides an additional connection to the memory device for the plurality of applications to access data stored by the memory device, and
the sub-set of channels are enabled to fulfil the front end bandwidth demand.

20. The method of claim 19, comprising determining an increase in the aggregate amount of front end bandwidth used in execution of the plurality applications, wherein the increase in aggregate front end bandwidth corresponds to at least one application of the plurality of applications exhibiting an increased bandwidth requirement.

21. The method of claim 19, comprising:
- determining a decrease in the aggregate amount of front end bandwidth used in execution of the plurality of applications;
- associating each of the plurality of applications to respective channels of the plurality of channels; and
- disabling one or more channels of the plurality of channels based, at least in part, on a front end bandwidth requirement of respective application of the plurality of applications.

22. The method of claim 21, wherein disabling the one or more channels of the plurality channels further comprises refraining from altering the operation of remaining enabled channels of the plurality of channels.

23. A system, comprising:
- a host;
- a storage device comprising a controller, a multiplexer, and a memory device, wherein the storage device is coupled to the host and wherein the controller is configured to:
  - determine an amount of front end bandwidth consumed in execution of respective applications executed by the host;
  - determine, based on the aggregate amount of front end bandwidth used by the plurality of applications running on the host computing system, a front end bandwidth demand for the plurality of applications;
  - assert respective Boolean signals to respective pins among a plurality of selection pins coupled to the multiplexer, wherein an output of a Boolean operation resulting from assertion of the respective Boolean signals to the respective pins corresponds to a quantity of channels among a plurality of channels utilized by the applications to access data from the memory device during execution of the applications that are disabled, wherein the respective assertion of the Boolean signals is based, at least in part, on the amount of front end bandwidth consumed in execution of the respective applications;
  - select a sub-set of channels from a portion of disabled channels responsive to the front end bandwidth demand; and
  - enable the sub-set of channels to fulfil the front end bandwidth demand.

24. The system of claim 23, wherein the controller is further configured to de-assert the respective Boolean signal to a first selection pin of the plurality of selection pins, wherein the first selection pin corresponds to a first channel utilized by a first application based at least in part on the amount of front end bandwidth consumed in the execution of the respective applications.

25. The system of claim 24, wherein the controller is configured to transfer the execution operation for the first application corresponding to the first channel to a second channel, wherein the first channel is disabled responsive to de-assertion of the respective Boolean signal to the first selection pin.

26. The system of claim 23, wherein the controller is further configured to cause independent operation of the selection pins coupled to the multiplexer.

27. The system of claim 23, wherein the controller is further configured to disable a first channel by de-asserting the respective Boolean signal to a first selection pin, wherein assertion of a different respective Boolean signal to a second section pin refrains from altering its operation responsive to the de-asserted first selection pin.

* * * * *